(12) United States Patent
Takehisa

(10) Patent No.: US 7,538,266 B2
(45) Date of Patent: May 26, 2009

(54) ELECTRONIC MUSICAL APPARATUS FOR TRAINING IN TIMING CORRECTLY

(75) Inventor: Hideaki Takehisa, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 11/691,126

(22) Filed: Mar. 26, 2007

(65) Prior Publication Data

US 2007/0234881 A1 Oct. 11, 2007

(30) Foreign Application Priority Data

Mar. 27, 2006 (JP) ............................. 2006-085569
Mar. 27, 2006 (JP) ............................. 2006-085570

(51) Int. Cl.
*A63H 5/00* (2006.01)
(52) U.S. Cl. ............................. 84/609; 84/612; 84/652; 84/668; 84/470 R
(58) Field of Classification Search ..................... 84/62, 84/478, 609, 649, 612, 652, 668, 470 R
See application file for complete search history.

(56) References Cited

U.S. PATENT DOCUMENTS

| | | | | |
|---|---|---|---|---|
| 4,694,723 | A | * | 9/1987 | Shinohara et al. ............. 84/609 |
| 5,286,909 | A | * | 2/1994 | Shibukawa ................... 84/609 |
| 6,461,239 | B1 | * | 10/2002 | Sagawa et al. ................. 463/7 |
| 6,638,160 | B2 | * | 10/2003 | Yoshitomi ...................... 463/7 |
| 6,645,067 | B1 | * | 11/2003 | Okita et al. .................... 463/7 |
| 2005/0096132 | A1 | | 5/2005 | Ueshima et al. |
| 2006/0252503 | A1 | * | 11/2006 | Salter .......................... 463/25 |
| 2007/0089592 | A1 | * | 4/2007 | Wilson et al. .................. 84/612 |

FOREIGN PATENT DOCUMENTS

| | | |
|---|---|---|
| JP | 6-067653 A | 3/1994 |
| JP | 2000-288254 A | 10/2000 |
| JP | 2005-21655 A | 1/2005 |

* cited by examiner

*Primary Examiner*—Jeffrey Donels
*Assistant Examiner*—Kawing Chan
(74) *Attorney, Agent, or Firm*—Rossi, Kimms & McDowell, LLP

(57) ABSTRACT

An electronic musical apparatus for training to play the apparatus in correct timing comprises a play timing notifying device which notifies reference time points in a music progression for operating the apparatus to play music, an operation detecting device for detecting each of player's operations on the apparatus as a player operates the apparatus with reference to the reference time points, a time deviation detecting device for detecting a time deviation of each of the player's operations from corresponding one of the reference time points, a tolerance range setting device for setting a tolerance range with respect to each of the reference time point by taking into consideration a plurality of the past detected time deviations, the tolerance range being for evaluating whether a detected time deviation falls within the tolerance range or not, and a tone generation control device which controls generation of tones for the player's operations differently according to whether each detected time deviation falls within the tolerance range or not. The tolerance range is set automatically based on the plurality of past detected time deviations. The tolerance range is divided into an advance margin and a delay margin about the reference time point, which two margins are preferably set separately. The detected time deviations are shown on a display screen in reference to the reference time points.

10 Claims, 14 Drawing Sheets

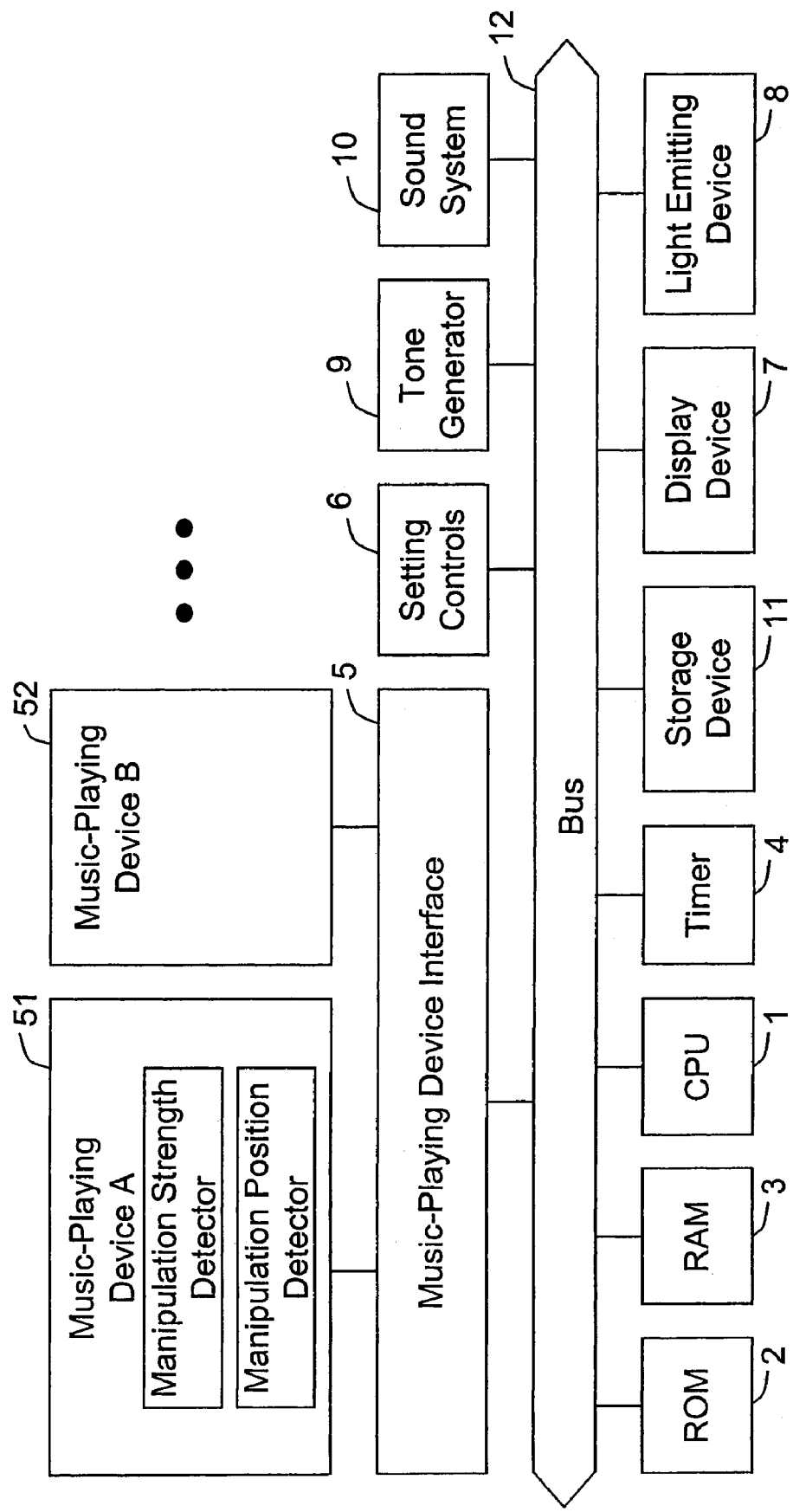
Fig. 1  Hardware Configuration of Electronic Musical Apparatus

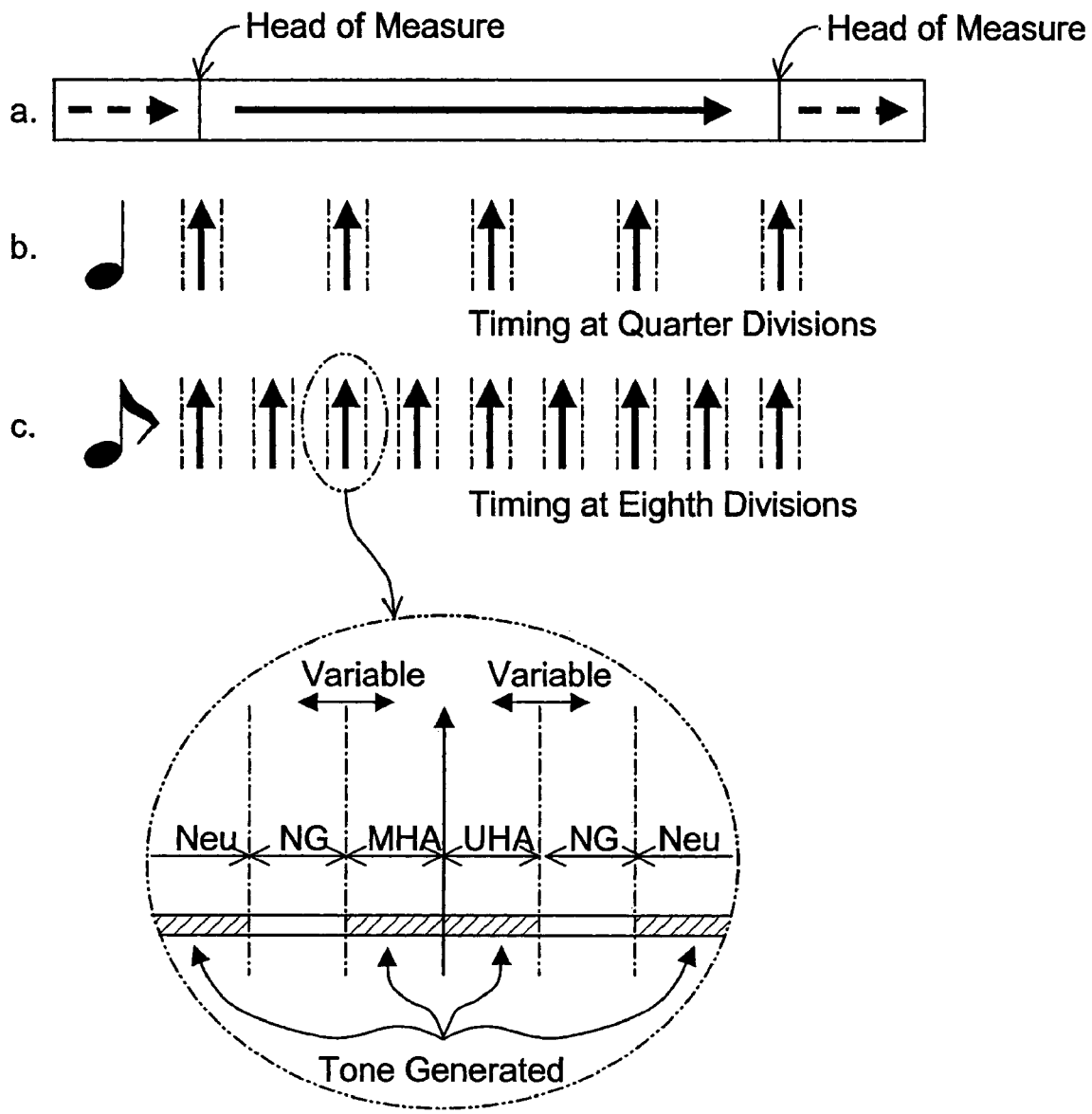
Fig. 2 Timing Chart of Music Progression and Rhythm Timing
MHA : Advance Margin (Tolerance Range)
UHA : Delay Margin (Tolerance Range)
NG : Out Zone
Neu : Neutral Zone

Fig.3 Margin Setting

| Level | Margin MHA/UHA |
|---|---|
| 1 | 2 |
| 2 | 6 |
| 3 | 8 |
| 4 | 10 |
| 5 | 12 |
| 6 | 14 |
| 7 | 16 |

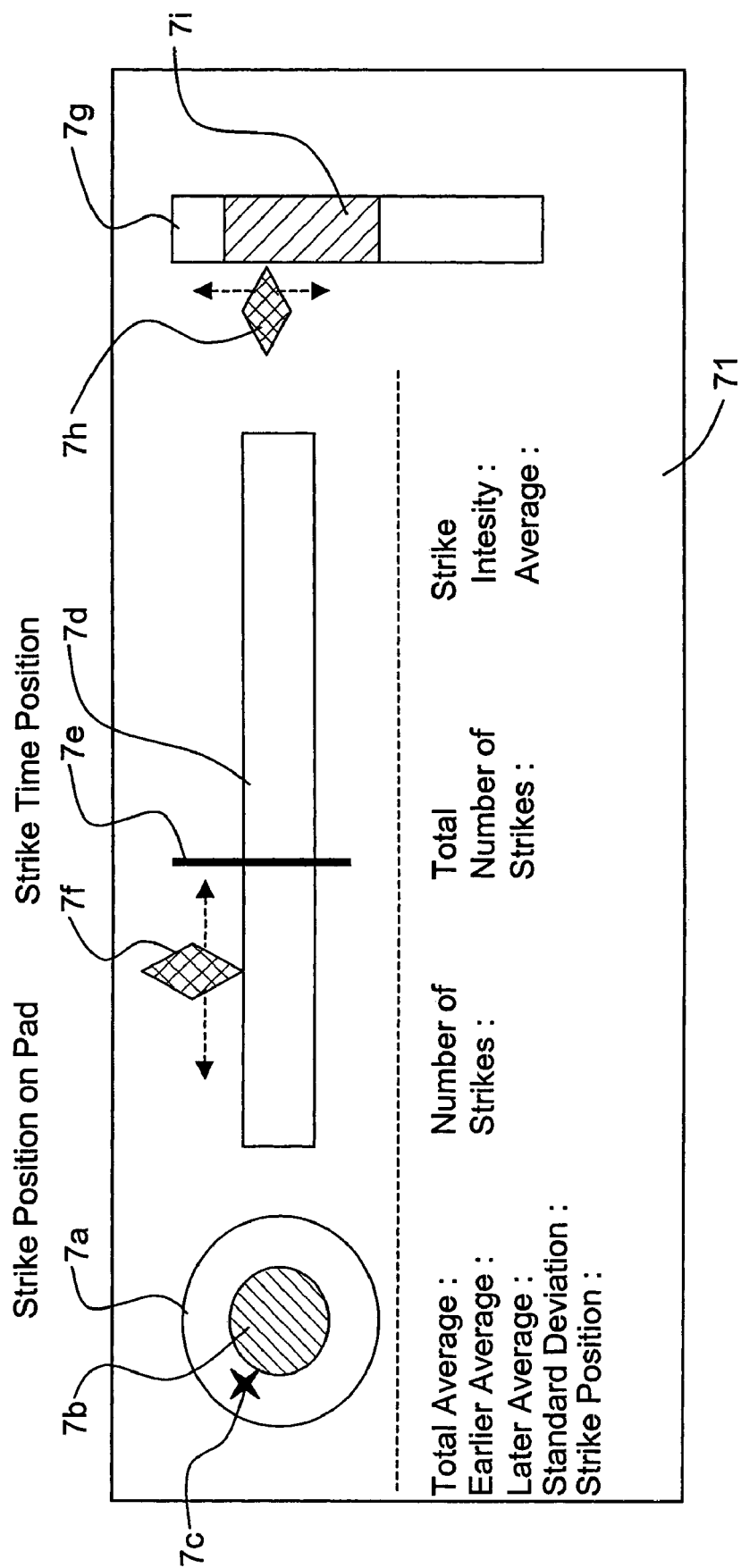
Fig. 4 Displayed Presentation

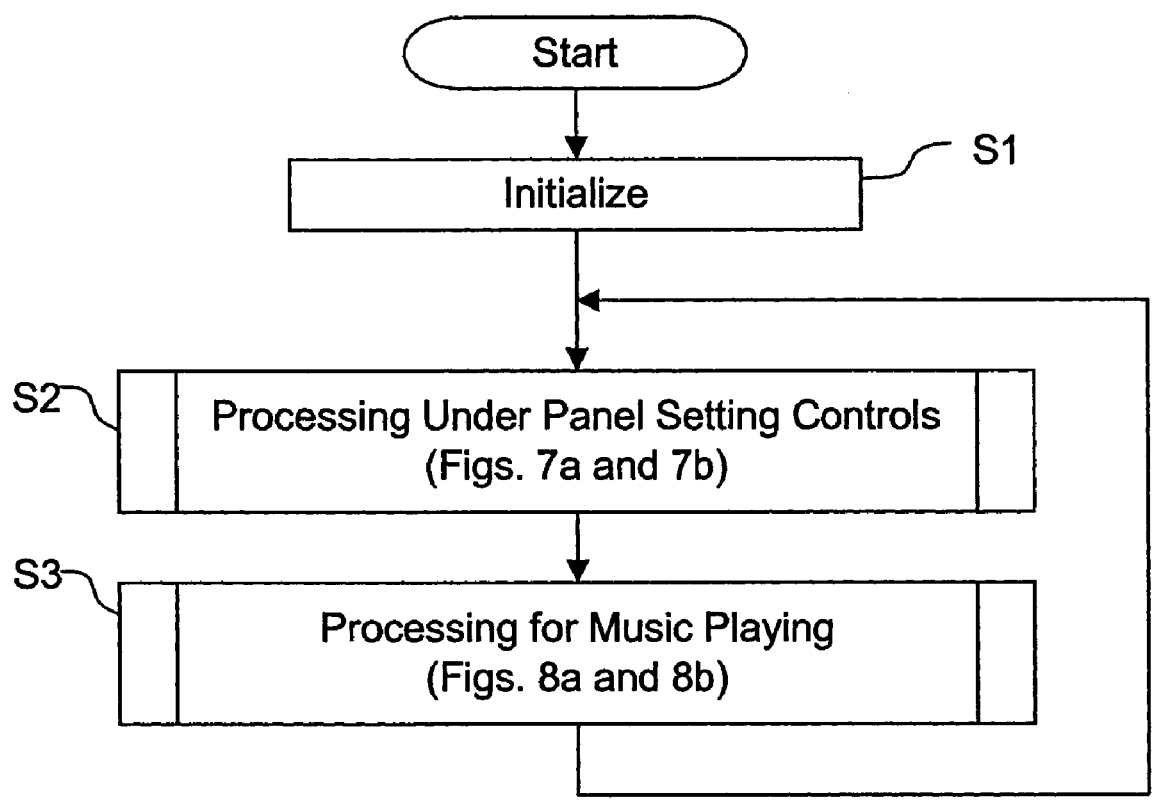
Fig. 5 Main Routine

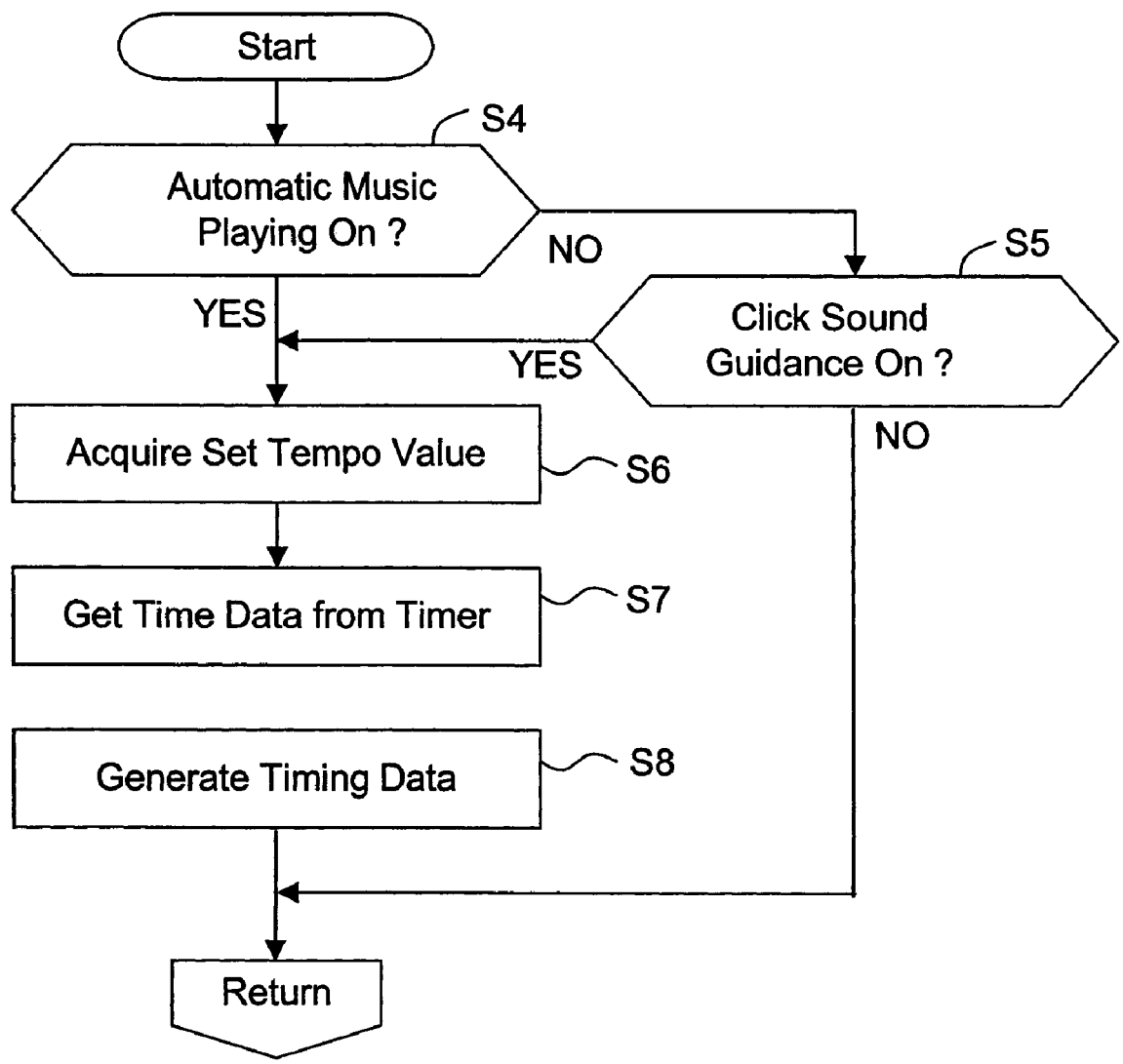
Fig.6 Interruption Routine

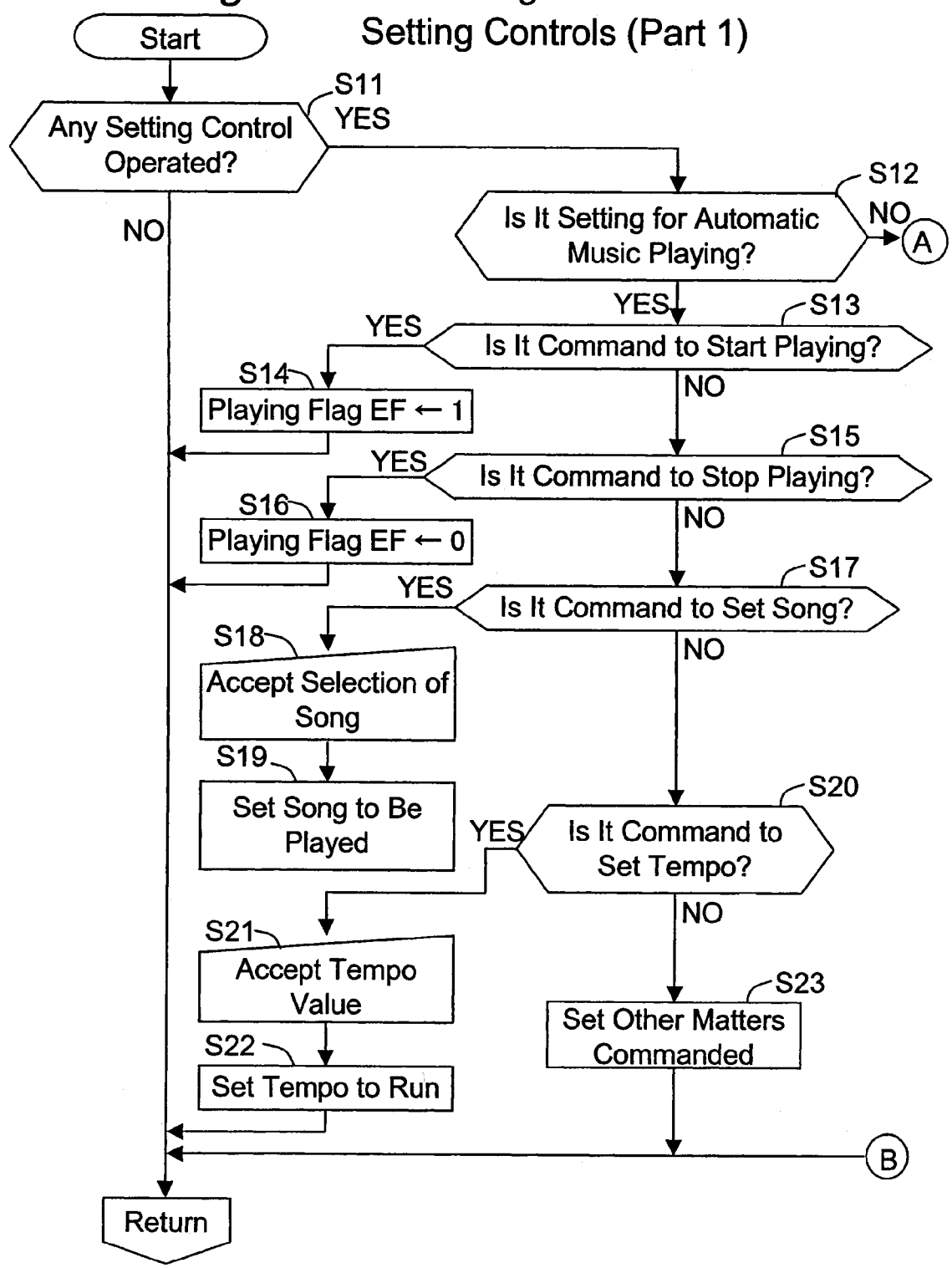
Fig. 7a Processing Under Panel Setting Controls (Part 1)

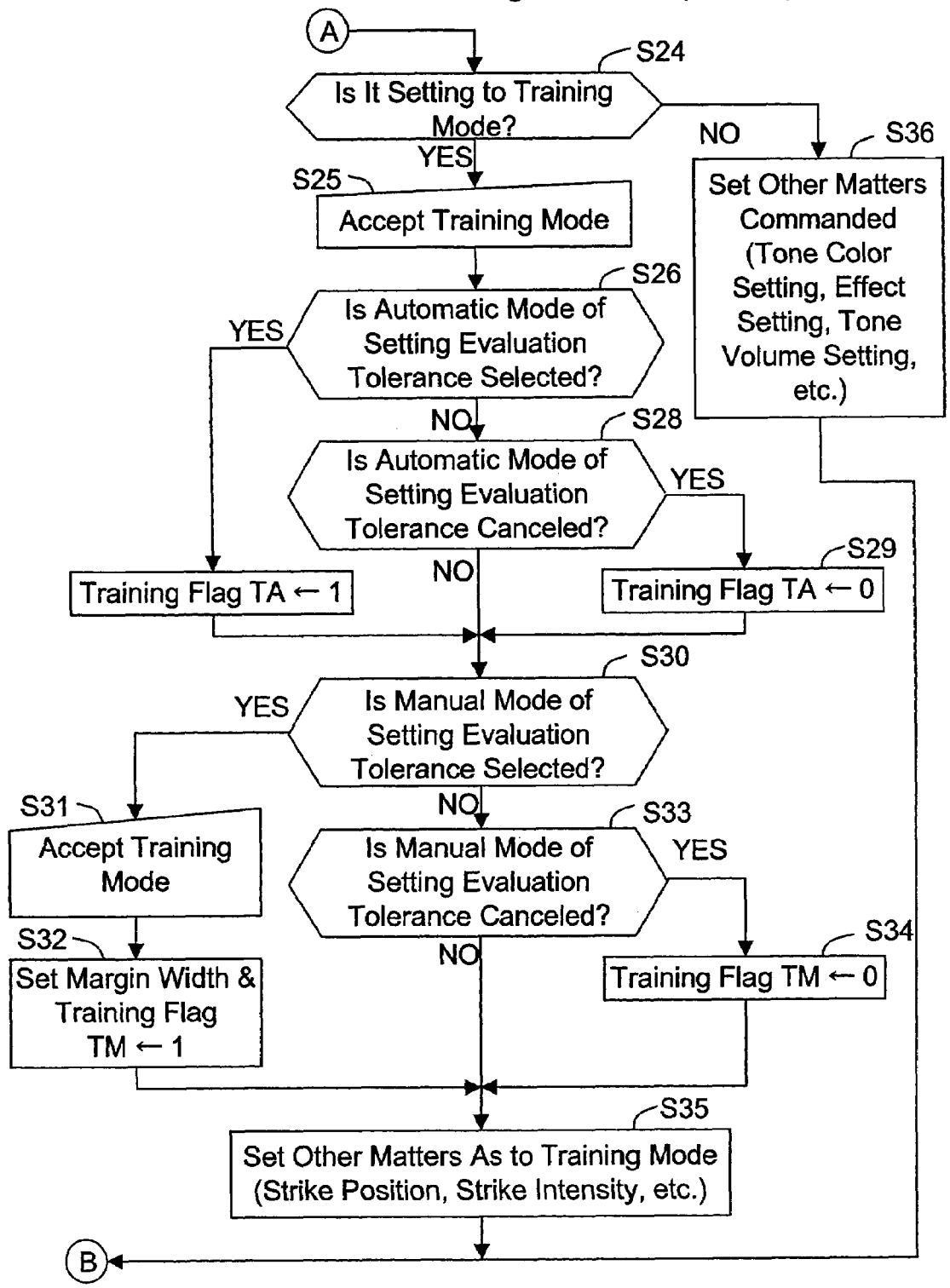

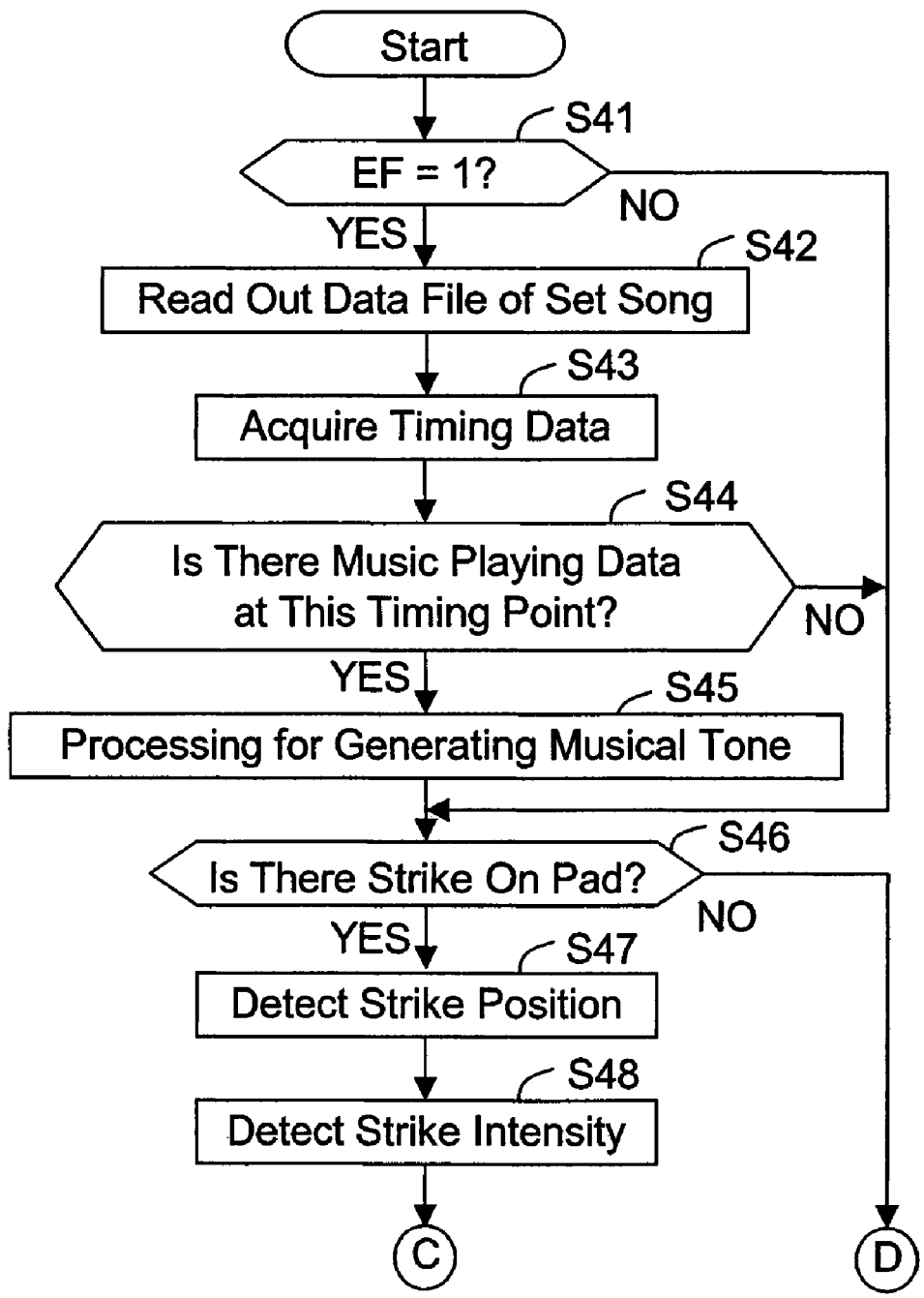
Fig. 8a Processing for Music Playing (Part 1)

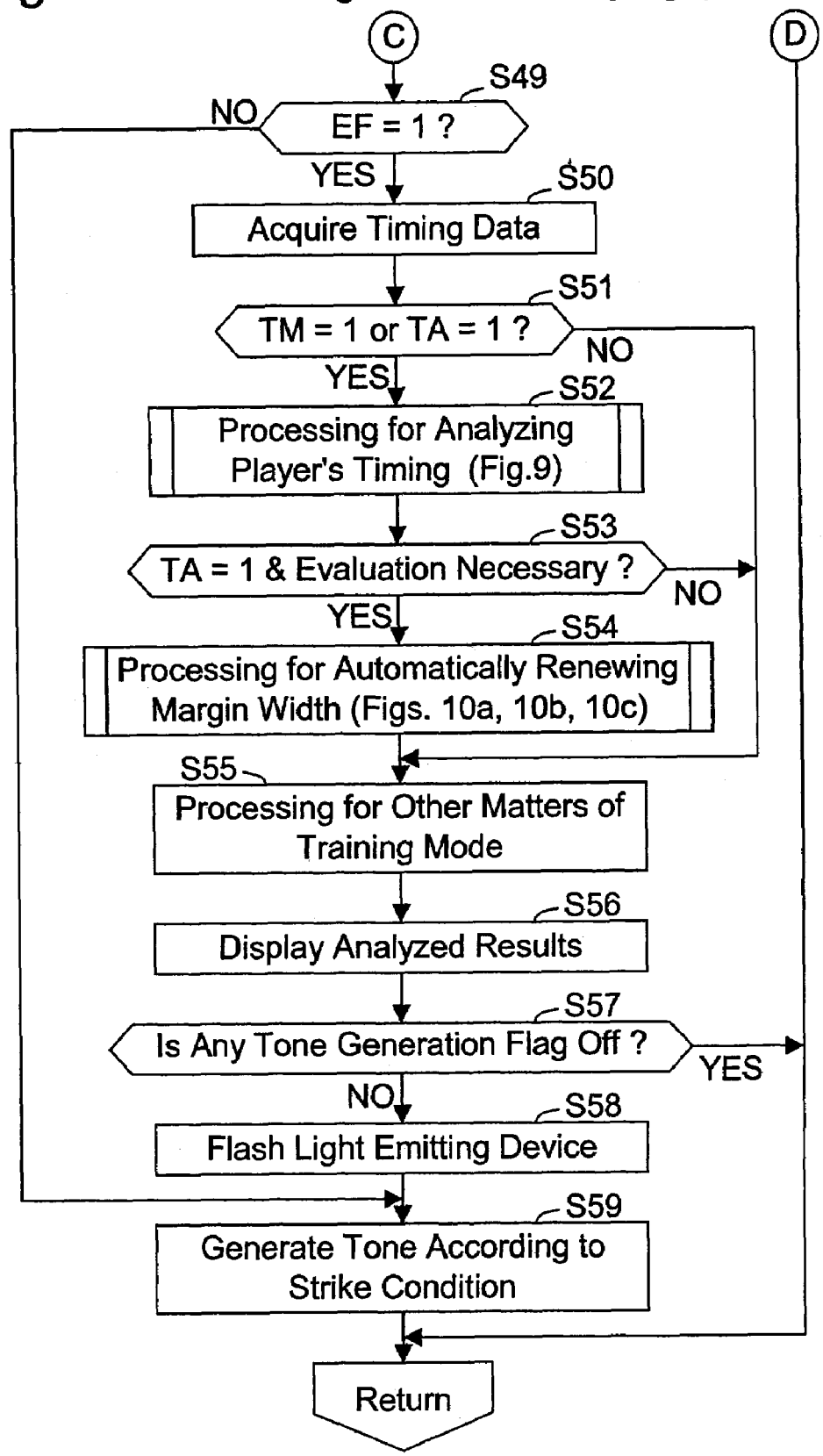
Fig.8b Processing for Music Playing (Part 2)

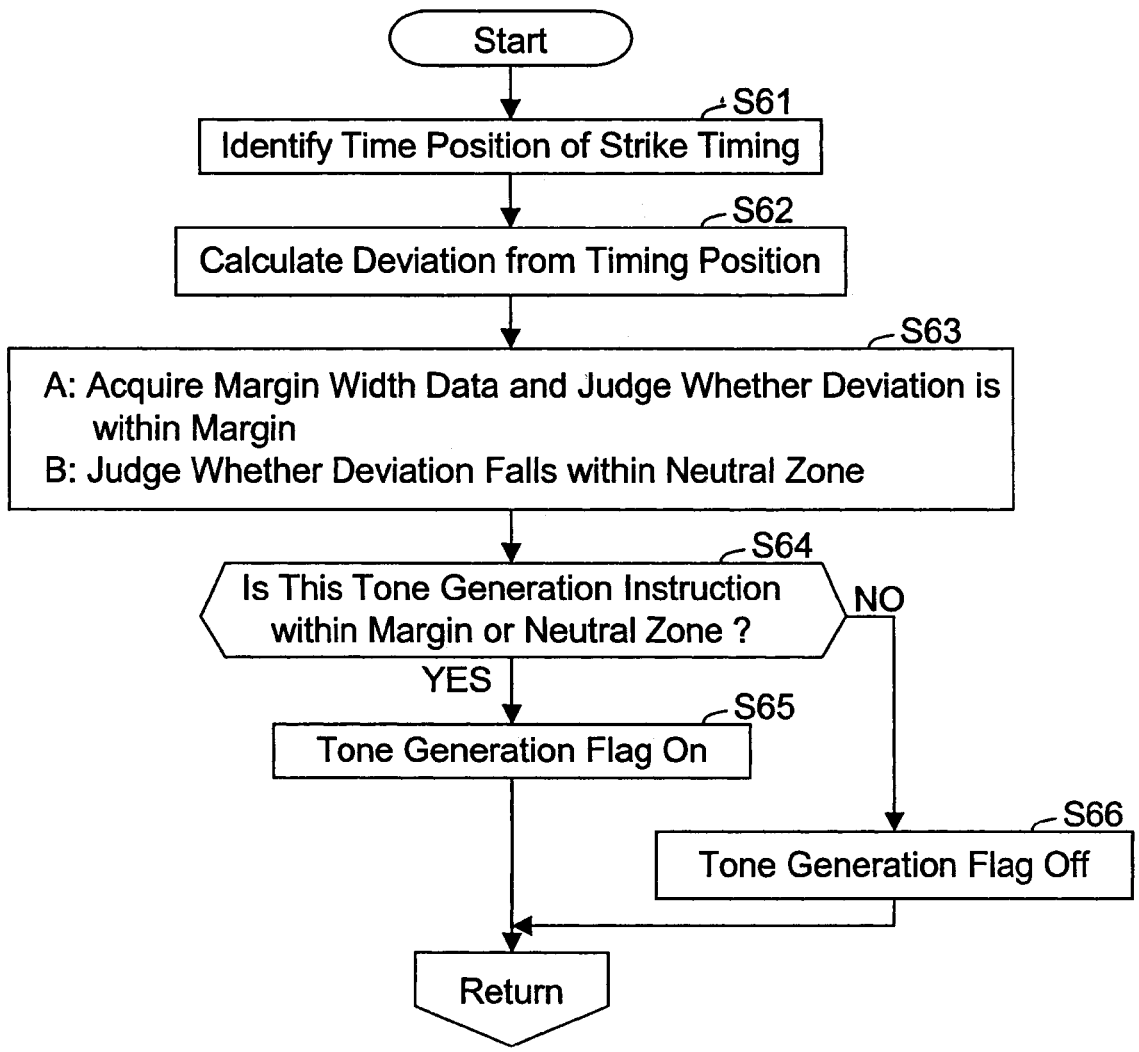

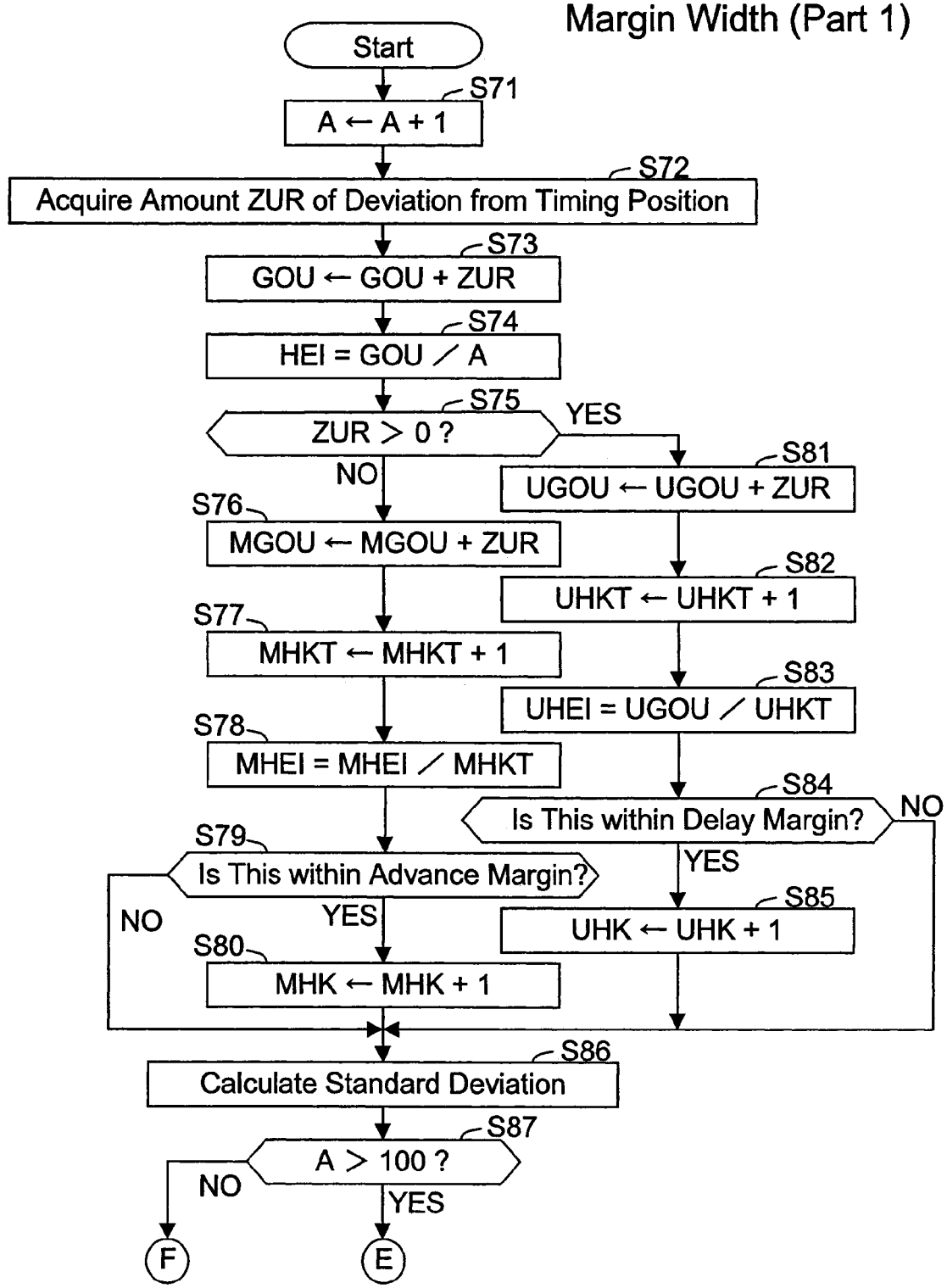

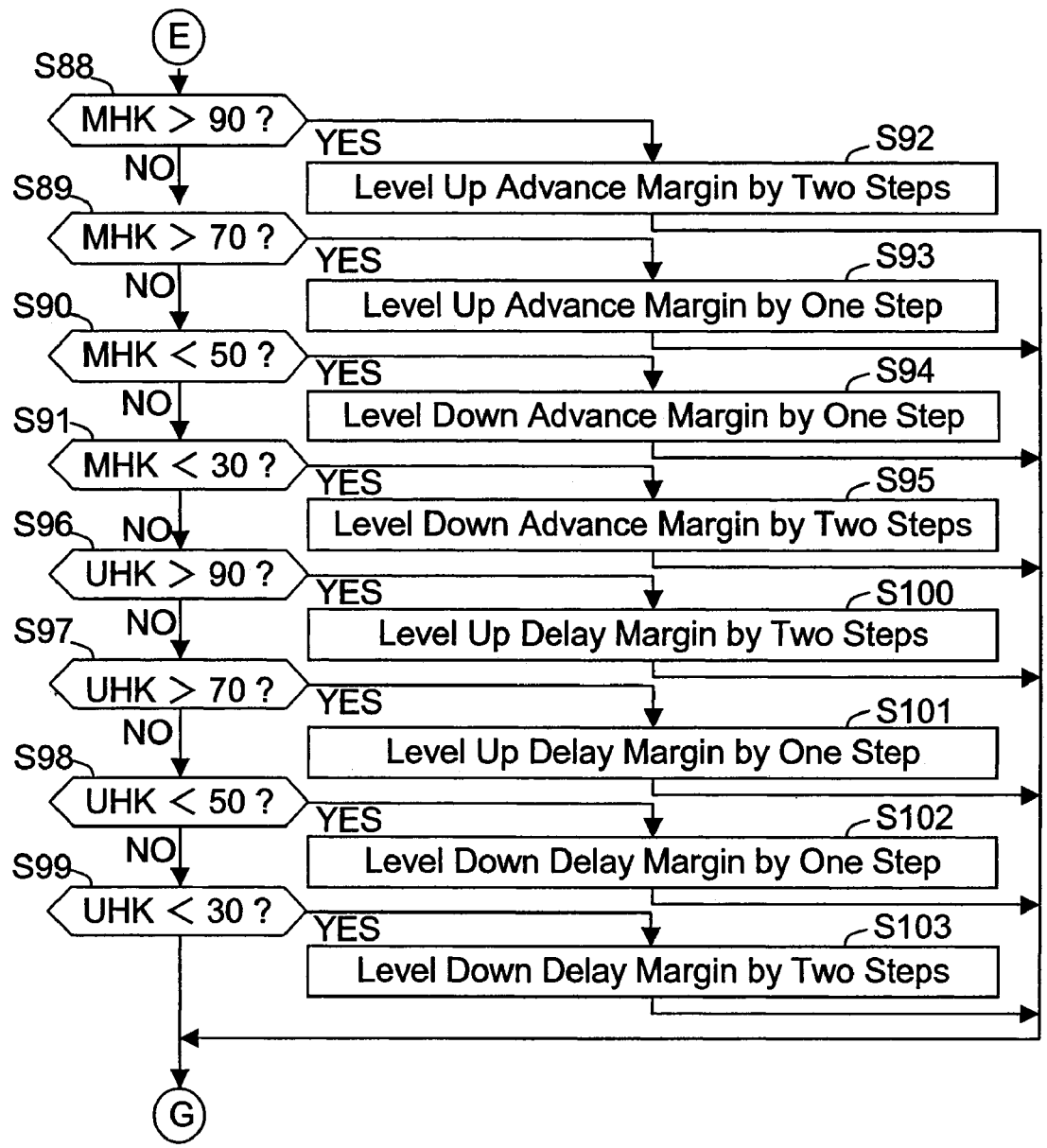

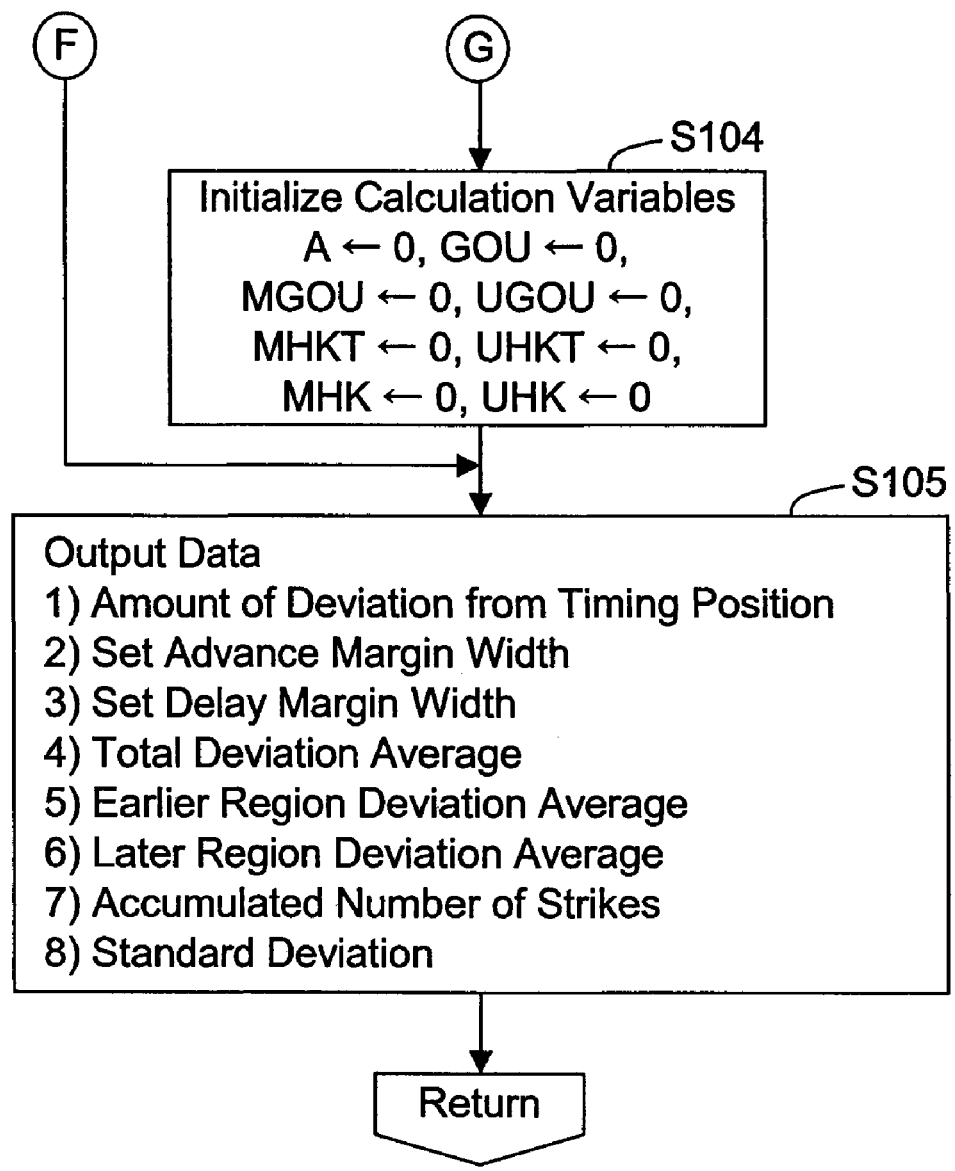
Fig. 10c Processing for Automatically Renewing Margin Width (Part 3)

ELECTRONIC MUSICAL APPARATUS FOR TRAINING IN TIMING CORRECTLY

TECHNICAL FIELD

The present invention relates to an electronic musical apparatus for training to play a musical instrument, and more particularly to an electronic musical apparatus for training in timing correctly to manipulate the musical instrument to the rhythmic progression of music, for example to strike a percussion instrument (like a drum) at the correct time points in the running musical progression such as an automatic music playing (or accompaniment) and a ticking tempo guidance with click sounds (like a metronome).

BACKGROUND INFORMATION

There are several musical apparatuses conventionally known in the art for teaching or aiding a trainee to play a musical instrument. For example, unexamined Japanese patent publication No. H06-067653 describes an electronic musical instrument which generates musical sounds with different sound effects imparted according to the correctness of the player's key depressing operations (manipulations) as the player plays a melody on the instrument following an automatic accompaniment or a melody guide. Unexamined Japanese patent publication No. 2000-288254 describes a game device which displays on a screen playing time instructions so that a player plays an electric guitar following the instructions, and then the device computes the time differences between the instructed times and the played times and displays on the screen the computed time difference for every instructed time. A further example is unexamined Japanese patent publication No. 2005-21655 (corresponding to unexamined US patent publication No. 2005/0096132 A1) which describes a music game system wherein indication objects are displayed on a monitor screen at the time intervals in agreement with the rhythm of music so that the player can generate musical tones in synchronism with the given music by striking the strike surface of the game console.

There is also known an electronic percussion musical instrument which gives an automatic accompaniment or a ticking tempo guidance for training a player to strike a percussion head at correct timing, wherein the trainee can selectively set a tolerance time range for evaluation, and the instrument evaluates the correctness of the trainee's strike time points in reference to the set tolerance and displays the evaluation result.

In the above mentioned electronic percussion instrument, however, the tolerance range is set by the trainee, and thus the once set tolerance range may become too wide for a trainee who has increased his/her ability or may become to narrow for a trainee who has decreased his/her ability. In either case, the trainee has to readjust the tolerance range by evaluating his/her own ability. It will be not easy to evaluate his/her own ability with some accuracy, and it will accordingly be not easy to set a correct tolerance range for his/her training. And further, a disadvantage may be that the trainee has to interrupt training to readjust the tolerance setting in the middle of the training, as the playing ability changes during the training.

Further, in the above mentioned electronic percussion instrument, the tolerance range is set with the same margins before and after the correct timing point, and thus such a training instrument may be useful for a trainee whose timing correctness is apt to be unstable in both sides, i.e. before and after the correct timing.

But many trainees have a tendency of striking the percussion head with a time deviation in either one direction from the correct timing, i.e. before the correct timing or after the correct timing. For such a trainee having a general tendency of one sided time deviation, such a training instrument will serve a half of the function.

SUMMARY OF THE INVENTION

In view of the foregoing background, therefore, it is a primary object of the present invention to provide an electronic musical apparatus for training with which a trainee can train himself/herself to play a musical instrument in correct timing with respect to the reference timing of a musical progression, as the apparatus provides proper conditions for the training, while the trainee does not have to self-evaluate his/her timing ability in playing the instrument nor to grasp his/her own conditions.

A further object of the present invention is to provide an electronic musical apparatus for training with which a trainee can train himself/herself to play a musical instrument in correct timing with respect to the reference timing of a musical progression, as the apparatus provides independent tolerance time widths which can be set separately for evaluating the trainee's manipulating time deviations before and after the reference timing, thereby meeting the trainee's tendency of time deviation to give a proper lesson to the trainee.

According to the present invention, the objects are accomplished by providing an electronic musical apparatus for training in timing correctly, which apparatus comprises: a play timing notifying device which notifies reference time points in a music progression for operating the apparatus to play music; an operation detecting device for detecting each of player's operations on the apparatus subject to evaluation as a player operates the apparatus with reference to the reference time points; a time deviation detecting device for detecting a time deviation of each of the player's operations subject to evaluation from corresponding one of the reference time points; a tolerance range setting device for setting a tolerance range with respect to each of the reference time point by taking into consideration a plurality of the detected time deviations, the tolerance range being for evaluating whether a detected time deviation falls within the tolerance range or not; and a tone generation control device which controls generation of tones for the player's operations differently according to whether each detected time deviation falls within the tolerance range or not.

The way of the different control by said tone generation control device can preferably be that when said time deviation falls within said set tolerance range, a tone is generated in response to said player's operation subject to evaluation, but when said time deviation falls outside said set tolerance range, no tone is generated in response to said player's operation subject to evaluation. The way of the different control by said tone generation control device can otherwise be that when said time deviation falls within said set tolerance range, a tone is generated in response to said player's operation subject to evaluation in a first tone volume or tone color, but when said time deviation falls outside said set tolerance range, a tone is generated in response to said player's operation subject to evaluation in a second tone volume or tone color which is less conspicuous than the first tone volume or tone color so that the trainee will realize his/her erroneous operation from the non-existence of the expected normal tone. Or alternatively, the second tone volume or tone color may be more conspicuous than the first tone volume or tone color so that the trainee will be positively notified by the apparatus of his/her erroneous operation by unexpected sounding of a tone.

In an aspect of the present invention, the tolerance range setting device may be to set the tolerance range automatically based on a plurality of detected time deviations. Thus, the trainee does not have to readjust the strictness of evaluation even when his/her music playing ability will change.

In another aspect of the present invention, the tolerance range setting device may be to set an advance margin before each reference time point and a delay margin after each reference time point separately, wherein the advance margin and the delay margin collectively constitutes the above mentioned tolerance range. Thus, the apparatus will give the trainee an efficient exercise, even though the trainee has a tendency of operation time deviations in either direction, before or after the reference timing.

In a further aspect of the present invention, the apparatus may further comprise a display device for displaying a visual image which represents the detected time deviation by illustrating the time of the player's operation in reference to the reference time point. Thus, the trainee can understand his/her ability from the displayed evaluation results.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described bellow.

BRIEF DESCRIPTION OF THE DRAWINGS

For a better understanding of the present invention, and to show how the same may be practiced and will work, reference will now be made, by way of example, to the accompanying drawings, in which:

FIG. 1 is a block diagram showing a hardware configuration of an embodiment of an electronic musical apparatus according to the present invention;

FIG. 2 is a timing chart of a musical progression illustrating the rhythm timing for click sounds and the tolerance ranges for generating tones with an embodiment of the present invention;

FIG. 3 is a table showing the tolerance ranges for the advance margin and the delay margin which can be variously set according to the present invention;

FIG. 4 is a chart showing an example of a displayed presentation during the training mode according to an embodiment of the present invention;

FIG. 5 is a flow chart showing the essential presentation of the main routine of the processing executed in an embodiment of an electronic musical apparatus according to the present invention;

FIG. 6 is a flow chart showing the interruption routine of the processing executed in an embodiment of an electronic musical apparatus according to the present invention;

FIGS. 7a and 7b are, in combination, a flow chart showing the processing executed according to the conditions of the panel setting controls with an embodiment of an electronic musical apparatus according to the present invention;

FIGS. 8a and 8b are, in combination, a flow chart showing the processing executed for music playing with an embodiment of an electronic musical apparatus according to the present invention;

FIG. 9 is a flow chart showing the processing for analyzing player's timing on an embodiment of an electronic musical apparatus according to the present invention; and FIGS. 10a, 10b and 10c are, in combination, a flow chart showing the processing executed for automatically renewing the margin widths.

DESCRIPTION OF THE PREFERRED EMBODIMENTS

The present invention will now be described in detail with reference to the drawings showing preferred embodiments thereof. It should, however, be understood that the illustrated embodiments are merely examples for the purpose of understanding the invention, and should not be taken as limiting the scope of the invention.

FIG. 1 shows a block diagram illustrating the overall hardware configuration of an embodiment of an electronic musical apparatus for training in timing correctly according to the present invention. The electronic musical apparatus of this embodiment is an electronic percussion musical instrument (e.g. an electronic drum) having a plurality of strike pads or strike surfaces.

A CPU 1 controls the entire electronic musical apparatus by data processing procedures using work area in a RAM 3 based on control programs stored in a ROM 2. A timer 4 is a circuit which generates a clock signal or pulse for defining the timing of an automatic music playing processing and the timing of a ticking tempo guidance with click sounds.

A music-playing device A, a music-playing device B, and so forth are strike pads, respectively, each comprising a sensor for detecting a manipulation or operation strength (strike intensity) and a sensor for detecting a manipulation or operation position (strike position on the pad surface). The detection signals from these music-playing devices A and B are respectively transferred to a system bus 12 via a music-playing device interface 5. The CPU 1 detects striking operations on the music-playing devices A and B and controls the generation of strike sounds (percussion sounds) in response to the striking operations.

The CPU 1 also detects manipulation events of setting controls (such as switches) 6 and executes processing according to the conditions set by the setting controls 6. The CPU 1 further controls the display conditions on a display device 7 such as an LCD panel. The display device 7 displays information about the set conditions of the various setting controls on a control panel or the like of the apparatus to assist the user in selectively setting various functions of the electronic percussion instrument. Such displayed information will be helpful, for example, in setting tone colors, tone effects and so forth or in selecting music pieces for automatic accompaniment or automatic playing. A data file of a music piece for automatic music-playing can be termed as a "song." Further, the setting or adjusting of the tempo (speed) for an automatic music-playing or for the ticking guidance with click sounds, and of the durations of the slick sounds are also possible by the use of the display device 7. The display device 7 also displays the strike time points in relation to the reference timing and the strike position on the strike pads of the music playing devices A and B as the user strikes on the pads, when the apparatus is working in the training mode.

A light emitting device 8 is a light emitting element or elements such as a light emitting diode (LED) arranged near or around the periphery of the strike pad of the music-playing device A 51 and music-playing device B 52 for emitting light when the corresponding pad is struck. The brightness of the light emitting device 8 may preferably be varied in accordance with the strike intensity, or the light emitting device may be controlled to flash only when the evaluation result proves to be good.

A tone generator 9 is to generate musical tone signals for a manual music-playing on the strike pads or for an automatic music-playing based on the stored music data file according to the data signal supplied thereto, being controlled by the CPU 1, when a manual music playing or an automatic music playing is running. The musical tone signals are supplied to a sound system 10, which in turn conducts a digital-to-analog (D/A) conversion and an amplification of the signals to finally emit sounds from a loudspeaker. A storage device 11 may be a hard disk or else and stores data files for automatic music playing. Further, tone color data, rhythm pattern data, effect data, and other programs may also be stored in the storage device 11.

Now an explanation will be made about the operation and the processing of the apparatus functioning in the training mode in which the trainee trains himself/herself in playing a drum by striking the music-playing devices (strike pads A and B) 51 and 52 to the click sound guidance. FIG. 2 is a timing chart of a musical progression illustrating the rhythm timing for click sounds with respect to an automatic music-playing and the tolerance ranges for generating tones in response to the trainee's strikes on the pads, in which the horizontal direction represents the time axis. It is supposed, for the purpose of explanation, that the illustrated music is of a quadruple meter of four-four time. The vertical arrows represent click sound timing indicating the time points for striking the pads. In FIG. 2, the row "a." illustrates the progression of an automatic music-playing (automatic accompaniment) having a string of contiguous measures, and when the training mode of practicing drum beating to an automatic music-playing is selected, the strike time points are set in reference to the head of each measure. The row "b." illustrates the timing at quater divisions where one measure is divided into four quarters, i.e. a time interval between the clicks corresponds to the duration of a quater note. The row "c." illustrates the timing at eighth divisions where one measure is divided into eight eighths, i.e. a time interval between the clicks corresponds to the duration of an eighth note.

The enlarged depiction in a dash-double-dot line circle illustrates the details of tolerance setting about a reference time point, in which an advance margin MHA is set just before the click time point and a delay margin UHA is set just after the click time point. The advance margin MHA and the delay margin UHA collectively constitute a tolerance range for a trainee's striking with reference to the reference click guidance, so that when the trainee's striking falls within the tolerance range, a tone will be generated in response to the trainee's strike. Needless to say, when the trainee's striking falls just on the reference time, a tone will be generated in response to the trainee's strike. When the trainee's striking is within the advance margin MHA or the delay margin UHA or on the reference time, the striking is evaluated to be in the correct timing. Further, out zones NG are set just before the advance margin MHA and just after the delay margin UHA, respectively, to inhibit the generation of a tone in response to the striking, if the striking falls within either of the out zones NG. When the trainee's striking is within either of the out zones, the striking is evaluated to be out of the correct timing or in the incorrect timing.

This embodiment is further provided with a function of generating tones even when the trainee's striking is not in the correct timing. Neutral zones Neu are set further before the out zone NG before the advance margin MHA and further after the out zone NG after the delay margin UHA, respectively, so that a tone will be generated in response to the trainee's striking. In this aspect, the tolerance range and the out zones for evaluation of the correctness of striking are set only near the reference time point of the timing guidance. This is to let the trainee's intentional striking in the middle of the adjacent reference time points (i.e. not at the reference time point) cause the generation of a tone in response to the trainee's striking. This is to meet the trainee's flexible practice with additional beatings, not limiting to a monotonous regular time beating of the reference timing guidance.

Thus with this embodiment, the trainee's strikes on the pads will cause the generation of tones in response to the strikes as long as the strikes are in the correct timing, but tones will not be generated if the strikes are in the incorrect timing. So, as the trainee increases his/her ability or skill in timing correctly, the number of tone generations will increase, and accordingly the trainee can recognize his/her progress in the music-playing skill. However, when the trainee has increased his/her skill to some good extent, all of the strikes will be evaluated to be correct, and a further progress may not be easily made. In this connection, the embodiment of the present invention provides a further improvement by varying the tolerance width to urge a further strict training.

The following description will be focused on the trainee's strikes near the reference time points of the correct timing, i.e. the strikes within the tolerance range and the out zones (these may be collectively termed as an "evaluation range"), and not the strikes within the neutral zone in view of the purpose of training.

As the trainee strikes the pads to continue training, the number of strikes is counted up and the time deviation of every strike from the corresponding reference time is detected one after another. For example, for every one hundred strikes the time deviations will be analyzed, and the analyzed result will be fed back to renew (vary) the time width of the advance margin MHA or the delay margin UHA. For example, the front line of the advance margin MHA or the rear line of the delay margin UHA will be varied as shown in the enlarged depiction of FIG. 2.

FIG. 3 is a table showing an example of the tolerance ranges for the advance margin MHA and the delay margin UHA which can be variously set in the embodiment of the present invention, wherein the widths of the margin are variously provided in seven levels. The numeral values for the margin are examples shown for convenience sake to understand the sizes of the width, and can be interpreted as the amounts in a certain unit of time. As the level goes from level 1 to level 7, the margin width become wider, where level 4 is the average middle. As the training proceeds, the number of strikes that fall within the advance margin and the number of strikes that fall within the delay margin are separately counted, and more the count number is, the higher the level is shifted toward level 1 (strict side), while the less the count number is, the lower the level is shifted toward level 7 (easy side).

More specifically, if the number of strikes within the advance margin MHA is large and the number of strikes within the delay margin UHA is small, it means that the trainee has a tendency of striking earlier than the guided timing. To train more properly, the width of the advance margin MHA will be narrowed and the width of the delay margin will be widened. As the early-biased tendency is decreased accordingly, the number of tones which are generated will increase. On the other hand, if the number of strikes within the advance margin MHA is small and the number of strikes within the delay margin UHA is large, it means that the trainee has a tendency of striking later than the guided timing.

Then, the width of the advance margin MHA will be widened and the width of the delay margin will be narrowed. As the late-biased tendency is decreased accordingly, the number of tones which are generated will increase. In the description below, the time span before the reference click time including the advance margin MHA and the out zone NG before MHA and not including the neutral zone Neu preceding the two is termed an "earlier region," and the time span after the reference click time including the delay margin UHA and the out zone NG after UHA and not including the neutral zone Neu following the two is termed a "later region."

FIG. 4 is a chart showing an example of a displayed presentation on the screen of the display device 7 during the training mode. In the lower half area of the display screen 71 are displayed the results of analysis (or evaluation) in numerals including the total average of the time deviations, the number of strikes at present, the total number of strikes, earlier region deviation average, later region deviation average, the standard deviation, the strike position, the strike intensity, and its average. In the upper half area of the display screen 71, near the left end, are displayed an illustration 7a of the strike pad with the sweet area 7b in its central portion, and further with the strike position 7c on the pad by means of a graphic presentation. Around the central portion in the upper half area are displayed the time axis 7d, the click time position line 7e crossing the time axis 7d and the strike time point mark 7f indicating the point of the trainee's actual strike on the time axis 7d. Further, near the right end in the upper half area of the display screen 71 are displayed a level indication bar 7g for showing the strike intensity and the strike intensity mark 7h indicating the intensity of the trainee's actual strike. The level indication bar 7g carries an adequacy zone mark 7i indicating the adequate intensity range. As the strike times deviate differently with respect to the reference timing, the displayed strike time point mark 7f moves back and forth with respect to the click time position line 7e. As the strike intensities vary differently, the displayed strike intensity mark 7h moves up and down along the level indication bar 7g. Thus, the trainee can easily understand his/her strike position, strike timing, strike intensity through the visual images on the display screen.

Herein-below will be described operations of an embodiment of the present invention with reference to the flow charts shown in the accompanying drawings. FIG. 5 is a flow chart showing the essential presentation of the main routine of the processing executed in the embodiment. FIG. 6 is a flow chart showing the interruption routine of the processing. FIGS. 7a and 7b are, in combination, a flow chart showing the processing executed according to the conditions of the panel setting controls. FIGS. 8a and 8b are, in combination, a flow chart showing the processing executed for music-playing. FIG. 9 is a flow chart showing the processing for analyzing player's timing. FIGS. 10a, 10b and 10c are, in combination, a flow chart showing the processing executed for automatically renewing the margin widths.

To begin with, the flags used in the data processing are defined as follows.

EF: an automatic music-playing flag, where EF=1 indicates that an automatic music-playing has been commanded and EF=0 indicates that an automatic music-playing has been canceled.

TA: an automatic tolerance setting flag, where TA=1 indicates that the processing is under the automatic tolerance setting mode (including evaluation of strike timing) and TA=0 indicates that the processing is not under the automatic tolerance setting mode.

TM: a manual tolerance setting flag, where TM=1 indicates that the processing is under the manual tolerance setting mode (including evaluation of strike timing) and TM=0 indicates that the processing is not under the manual tolerance setting mode.

A: a strike count register which counts the number of strikes in the evaluation range, i.e. the time range other than the neutral zone Neu.

ZUR: a deviation register which stores a detected time deviation.

GOU: a deviation sum register which stores a sum of the deviation values.

HEI: a deviation average register which stores an average of the deviation values.

MGOU: an early deviation sum register which stores a sum of the deviation values about the strikes in the earlier region.

UGOU: a late deviation sum register which stores a sum of the deviation values about the strikes in the later region.

MHKT: an early strike number register which stores the number of strikes in the earlier region.

UHKT: a late strike number register which stores the number of strikes in the later region.

MHK: an advanced strike number register which stores the number of strikes in the advance margin.

UHK: a delayed strike number register which stores the number of strikes in the delay margin.

The main routine of FIG. 5 starts upon power connection to the apparatus. Firstly, an initialization process takes place in a step S1 to reset various flags and registers. Then, processing through a step S2 and a step S3 is repeated in a loop as long as the power is kept on. The step S2 is the processing under the conditions of the panel setting controls, which processing will be described in detail with reference to FIGS. 7a and 7b herein later. The step S3 is the processing for the music-playing, which processing will be described in detail with reference to FIGS. 8a and 8b herein later. The step S2 is to set the various parts or functions of the apparatus by processing the related data in response to the manipulated conditions of the setting controls 6 on the control panel. The step S3 is to detect the music-playing operations of the player such as the striking actions on the percussion pads and conduct the tone generation processing in the music-playing mode, as well as to notify the player the training situations and generate musical tones for an automatic music playing or click sounds for a ticking tempo guidance in the training mode.

The interruption routine of FIG. 6 is executed in parallel with other processing such as the main routine processing upon receipt of an interruption request. To start with, a step S4 judges whether an automatic music-playing is set "on" from the automatic music-playing flag EF. Then, a step S5 judges whether the click sound guidance function is set "on." If both judgments are negative (NO), the process flow returns back to the original routine. If both or either of the judgments is positive (YES), the process proceeds to a step S6 to acquire a tempo value set in the automatic music playing data file or a tempo value set by the player, and then a step S7 gets the time data from the timer 4 to recognize the current time, and then a step S8 generates timing data before returning to the original routine. The time data established in this processing is used as the timing data for progressing an automatic music-playing, for generating click sounds, and for evaluating the strike timing.

FIGS. 7a and 7b are, in combination, a flow chart showing the details of the subroutine flow of the step S2 of FIG. 5, which processing is executed according to the conditions of the panel setting controls. A step S11 (FIG. 7a) judges whether any setting control 6 is operated. If no setting control is operated, the process flow returns to the original routine, i.e. the process goes forward to the step 3 of FIG. 5. If there is a setting control which is operated the process proceeds to a step S12 or further to a step S24 (FIG. 7b) to start the processing for the operated setting control.

If the step S12 (FIG. 7a) judges that the operated setting control is for an automatic music-playing, the processing through steps S13-S23 will take place before returning to the original routine. In this processing, the step S13 judges whether the operation of the setting control is a command to start an automatic music-playing, and if the judgment is affirmative (YES), the process moves to the step S14 to set the automatic-music playing flag EF to "1" before returning to the original routine. If the judgment at the step S13 is negative (NO), the process flow goes to the step S15 to judges whether the operation of the setting control is a command to stop the automatic music-playing. If so, the step S16 sets the automatic music-playing flag EF to "0" before returning to the original routine. When the step S17 judges that the operation of the setting control is a command to set a song (i.e. a music piece data file), and if so, the step S18 accepts the selection (by the player) of a song and then the step S19 sets the selected song to be played in the automatic music-playing. When the step S20 judges that the operation of the setting control is a command to set a tempo, and if so, the step S21 accepts the tempo value (from the player) for the song and then the step S22 sets the tempo to run the automatic music-playing. The step S23 is to conduct processing to set other matters commanded.

If the step S24 (FIG. 7b) judges that the operation of the setting control is to set the apparatus to the training mode, the process flow goes forward to a step S25 to accept the selection (by the player) of the training mode, and then a step S26 judges whether the automatic mode of setting the evaluation tolerance for the music-playing timing is selected, and if so, a step S27 sets the automatic tolerance setting flag TA to "1." If the automatic setting mode is not selected, a step S28 judges whether the automatic mode of setting the evaluation tolerance is now canceled, and if so, a stop S29 sets the automatic tolerance setting flag TA to "0." Next, a step S30 judges whether the manual mode of setting the evaluation tolerance for the music-playing timing is selected, and if so, a step S31 accepts the selection (by the player) of the margin width, and a step S32 sets the margin width and set the manual tolerance setting flag TM to "1." If the manual setting mode is not selected, a step S33 judges whether the manual mode of setting the evaluation tolerance is now canceled, and if so, a step S34 sets the manual tolerance setting flag TM to "0."

Then a step S35 performs the processing of setting other matters as to the training mode. For example, if the training mode is for mastering the correct strike position, a strike position is detected and evaluated as to how near to the center of the strike pad, and for this purpose the tolerance range is defined by the distance from the center of the strike pad, which distance may be set automatically or manually. If the training mode is for mastering the correct strike strength, a strike strength is detected and evaluated whether the strike strength is neither too strong nor too weak, and for this purpose the tolerable strength range may be set automatically or manually. A step S36 is to set other (than the training mode) matters commanded by the player such as the tone color setting, the effect setting and the tone volume setting. And after the step S23 or S35 or S36, the processing flow returns to the original routine.

FIGS. 8a and 8b are, in combination, a flow chart showing the details of the subroutine flow of the step S3 of FIG. 5, which processing is executed for the music-playing function.

A step S41 (FIG. 8a) judges whether the automatic music playing flag EF=1 or not. If the judgment is affirmative (YES), the process flow goes through steps S42-45 to execute an automatic music-playing processing. Next, a step S46 judges whether there is a strike on the pad, and if the judgment is affirmative (YES), the process flow goes through steps S47-S59 (FIGS. 8a and 8b) to execute a strike-responsive processing.

The step S42 (FIG. 8a) reads out the data file of the set song (music piece), the step S43 acquires the timing data, and the step S44 judges whether there is music-playing data at this timing point in the read-out song data file. If the judgment at the step S44 is affirmative (YES), the step S45 executes a tone generation processing for the music-playing data. The tone generation includes generation of tones of musical notes constituting a music piece or an accompaniment and of click sounds for the ticking guidance.

In the strike-responsive processing, the steps S47 and S48 detect the position and the intensity, respectively, of a strike on the pad by means of the sensors attached to the pad. Then, the step S49 (FIG. 8b) judges whether the automatic music-playing flag EF=1 or not. If the judgment is negative (NO), it means that the mode is not the automatic music-playing mode, and accordingly it means that the mode is not the training mode, in other words it is a normal instrument playing mode, and then the processing flow jumps to the step S59 to generate a tone according to the strike condition before returning to the original routine. If the judgment at the step S49 proves EF=1, the process flow goes to the step S50 to acquire the timing data. Next, the step S51 judges whether "TM=1 or TA=1" or not. If the judgment at the step S51 proves neither TM=1 nor TA=1, there is no need of evaluating the strike timing and of automatic setting of the margin width, and the process flow jumps to the step S55. If the judgment at the step S51 is either TM=1 or TA=1, the step S52 executes the processing for analyzing the player's timing, which processing is described in more detail in the subroutine flow of FIG. 9. Next, the step S53 judges whether TA=1 and evaluation is necessary. If the judgment proves TA=0 or evaluation is unnecessary, it means that the mode is not the automatic setting mode or the strike need not be evaluated, then the process flow also jumps to the step S55. If the judgment is TA=1 and further that evaluation is necessary, it means that the mode is the automatic setting mode and the strike needs to be evaluated, the step S54 executes the processing for automatically renewing the margin width, which processing is described in more detail in the subroutine flow of FIGS. 10a-10c, and then the process moves forward to the step S55.

The step S55 performs processing for other matters of the training mode. For example, where the mode of evaluating strike positions is set, a strike position on the pad is evaluated, and a tone is generated or not according to the evaluation result, and further the size of the tolerance area for evaluating strikes will be widened or narrowed reflecting the trainee's skill. Where the mode of evaluating strike intensities is set, a strike intensity on the pad is evaluated as to whether the intensity is within the set acceptable range, and then a tone is generated or not generated according to the evaluation of the strike intensity, and further the size of the acceptable range for evaluation may be widened or narrowed automatically.

Then, the step S56 displays the analyzed evaluation results (data) on the display device 7 before going to the step S57. The step S57 judges whether there is any tone generation flag which is off. The tone generation flags include the flag which is off when the strike time point falls within the neutral zone NG, the flag which is off when the strike position on the pad falls outside the tolerance area, and the flag which is off when the strike intensity is not in the acceptable range. If there is any one tone generation flag which is off, the process flow skips the steps S58 and S59 to avoid light flashing and tone sounding, and returns to the original routine. If there is no tone generation flag that is off, the process flow proceeds to the step S58 to flash the light emitting device, and then to the step S59 to generate a tone according to the detected strike condition, before returning to the original routine. The process flow may be modified such that the light emitting device flashes only when the strike falls within the tolerance range. The tone generation flags are selectively used depending on which training functions are being used. For example, where the training mode is to evaluate the strike time points only, the processing uses only the tone generation flag which is turned off when the strike time point falls within the neutral zone Neu. The tone generation flags are turned on or off in the processing for analyzing the player's timing of FIG. 9 describing the subroutine flow of the step S52.

FIG. 9 is a flow chart showing the details of the subroutine flow of the step S52 of FIG. 8*b*, which is the processing for analyzing player's timing to evaluate the player's strikes. A step S61 detects the player's strike and identifies the time position of the strike timing, and then a step S62 calculates the time deviation of the player's time position from the correct (or reference) timing position by the click sound. Next, a step S63 acquires the margin width data for the current timing and judges whether the time deviation is within the margin (the advance margin or the delay margin). The step S63 also judges whether the time deviation falls within the neutral zone Neu. Then, a step S64 judges whether the judgment at the step S63 means an instruction to generate a tone, coming within either of the margins or within the neutral zone. If the judgment is affirmative (YES), the process flow goes to a step S65, which sets the tone generation flag "on" before returning to the original routine. If the judgment is negative (NO), the process flow goes to a step S66, which sets the tone generation flag "off" before returning to the original routine.

FIGS. 10*a*, 10*b* and 10*c* are, in combination, a flow chart showing the details of the subroutine flow of the step S54 of FIG. 8*b*, which is the processing for automatically renewing the margin widths. Firstly, a step S71 (FIG. 10*a*) is to count the number of strikes by incrementing the strike count register A by "1," every time the strike to be evaluated is detected. Next, a step S72 acquires an amount ZUR representing the time deviation of the strike time from the reference timing. The deviation value ZUR is a value obtained by subtracting the reference time count from the strike time count. As the time count is a value which increases as the time progresses, a larger value represents a later time. Accordingly, the strike time count assumes a negative value in the earlier region, i.e. when the strike is before the click sound timing, while it assumes a positive value in the later region, i.e. when the strike is after the click sound timing. Thus the sign of the deviation value tells whether the strike is in the early region or in the later region. A step S73 is to accumulate the deviation values ZUR to obtain the sum GOU of the deviation values by adding the current ZUR to the preceding GOU. A step S74 calculates the average HEI of the deviation values by dividing the GOU value by the number A of strikes.

A step S75 judges the sign of the current deviation value ZUR. If the sign is negative, it means that the strike is in the earlier region, and the process flow proceeds to a step S76 to accumulate the deviation values ZUR to obtain the sum MGOU of the deviation values in the earlier region by adding the current ZUR to the preceding MGOU. Then, a step S77 is to count the number MHKT of strikes in the earlier region by incrementing the MHKT value by "1," every time the strike in the earlier region is detected. A step S78 calculates the average MHEI of the deviation values in the earlier region by dividing the MGOU value by the number MHKT of the strikes in the earlier region. Then, a step S79 judges whether the strike is within the advance margin. If so, a step S80 counts the number MHK of strikes in the advance margin by incrementing the MHK value by "1," every time the strike in the advance margin is detected.

If the step S75 judges the sign of the deviation value ZUR is positive, it means that the strike is in the later region, and the process flow proceeds to a step S81 to accumulate the deviation values ZUR to obtain the sum UGOU of the deviation values in the later region by adding the current ZUR to the preceding UGOU. Then, a step S82 is to count the number UHKT of strikes in the later region by incrementing the UHKT value by "1," every time the strike in the later region is detected. A step S83 calculates the average UHEI of the deviation values in the later region by dividing the UGOU value by the number UHKT of the strikes in the later region. Then, a step S84 judges whether the strike is within the delay margin. If so, a step S85 counts the number UHK of strikes in the delay margin by incrementing the UHK value by "1," every time the strike in the delay margin is detected.

A step S86 calculates the standard deviation of the deviation values covering all the samples of the deviation values both in the earlier region and the later region. The standard deviation tells how sparse or dense the samples are distributed. Then a step S87 judges whether the number A of strikes is greater than "100." If A is not greater than one hundred, the process flow jumps to a step S105 (FIG. 10*c*) to output the data of the current amount of time deviation from the correct timing position, the set advance margin width, the set delay margin width, the total average of the time deviations, the earlier region deviation average, the later region deviation average, the accumulated number of strikes, and the standard deviation, before returning to the original flow. The outputted data are displayed on the display screen as shown in FIG. 4 (in the lower half area). If the number A of strikes is greater than one hundred, the process flow proceeds to steps S88 through S103 to renew (i.e. automatically vary) the advance margin width and the delay margin width which have been set until now.

The steps S88 through S91 are to judge the number of strikes that fall within the advance margin, and the steps S92 through S95 varies the set width of the advance margin depending on the correctness of the player's strikes. With the shown example, if the correct strikes are more than ninety ("90"), the advance margin width is leveled up (i.e. narrowed) by two steps; if more than seventy ("70"), then is leveled up by one step; if less than fifty ("50"), then is leveled down (i.e. widened) by one step; and if less than thirty ("30"), then is leveled down by two steps.

Similarly, the steps S96 through S99 are to judge the number of strikes that fall within the delay margin, and the steps S100 through S103 varies the set width of the delay margin depending on the correctness of the player's strikes. With the shown example, if the correct strikes are more than ninety ("90"), the delay margin width is leveled up (i.e. narrowed) by two steps; if more than seventy ("70"), then is leveled up by one step; if less than fifty ("50"), then is leveled down (i.e. widened) by one step; and if less than thirty ("30"), then in leveled down by two steps.

Thereafter, a step S104 initializes the calculation variables including the flag registers before going to the step S105 to output the analyzed data. After the above described processing through the steps S88 through S104, the data of the set advance margin width and the set delay margin width are displayed, and the other data are the same as those displayed in the case of the number of strikes less than one hundred.

According to the above described processing, a tone will be generated if the time deviation of the strike (to be evaluated) from the reference timing is within the set margins, while a tone will not be generated if the time deviation of the strike from the reference timing is outside the set margins. Thus, the conditions of the deviations of the strikes are notified to the player. The player can also understand the evaluations about his/her strikes up until now from the displayed images and data. Further, according to the above described embodiment, the margin widths are automatically adjusted for better evaluation based on the past evaluations, when the number of strikes exceeds a given number such as one hundred.

Further, with the embodiment described above, as the advance margin and the delay margin are separately set, an efficient and effective training will be given to a trainee, even though the trainee has timing tendency of striking either earlier or later than the correct timing in the musical progression. For example, in the case of a trainee who tends to strike earlier, the advance margin will be set wider in the beginning stage and will be automatically set narrower and narrower (i.e. more and more strict) as the training stage progresses, while the delay margin will be substantially unchanged. Thus the trainee will get a focused training to improve the advanced timing. On the contrary, in the case of a trainee who tends to strike later, the delay margin will be set wider in the beginning and will be automatically set narrower and narrower as the training goes on, while the advance margin will be substantially unchanged. Thus the trainee will get a focused training to improve the delayed timing.

While the number of strikes within the tolerance is analyzed and the tolerance width is accordingly varied in the above described embodiment, the amounts of the time deviations may be individually analyzed and the tolerance width may be determined according to the evaluation results.

While the margin widths are automatically renewed when the number of strikes exceeds one hundred in the above described embodiment, the criterial number may be other than one hundred. In place of automatically renewing the margin widths, some simple manual setting control such as a switch may be provided to set the margin width by the manipulation by the trainee.

Further, with the described embodiment, when the strikes fall within the tolerance range, the corresponding tones will be generated, and when the strikes do not fall within the tolerance range, no tone will be generated, but this may be otherwise designed such that when the strikes fall within the tolerance range, the corresponding tones will be generated in the regular tone color, and when the strikes fall outside the tolerance range, tones will be generated in another tone color.

While the embodiment has been described as an electronic percussion musical instrument, the invention can be applicable or can be realized in other types of musical instruments which analyze and evaluate the time deviations in music-playing timing While several preferred embodiments have been described and illustrated in detail herein above with reference to the drawings, the present invention can be practiced with various modifications without departing from the spirit of the present invention. The point is that the music-playing time points are analyzed and evaluated, and the evaluation results are fed back to vary the setting of the reference tolerance range.

While particular embodiments of the invention and particular modifications have been described, it should be expressly understood by those skilled in the art that the illustrated embodiments are just for preferable examples and that various modifications and substitutions may be made without departing from the spirit of the present invention so that the invention is not limited thereto, since further modifications may be made by those skilled in the art, particularly in light of the foregoing teachings.

It is therefore contemplated by the appended claims to cover any such modifications that incorporate those features of these improvements in the true spirit and scope of the invention.

What is claimed is:

1. An electronic musical apparatus for training in timing correctly, said apparatus comprising:
   a play timing notifying device which notifies reference time points in a music progression for operating said apparatus to play music;
   an operation detecting device for detecting each of player's operations on said apparatus subject to evaluation as a player operates said apparatus with reference to said reference time points;
   a time deviation detecting device for detecting a time deviation of each of said player's operations subject to evaluation from corresponding one of said reference time points;
   a tolerance range setting device for setting a tolerance range with respect to each of said reference time point by taking into consideration a plurality of said detected time deviations, said tolerance range being for evaluating whether a detected time deviation falls within said tolerance range or not; and
   a tone generation control device which controls generation of tones for said player's operations differently according to whether each detected time deviation falls within said tolerance range or not,
   wherein said tolerance range setting device sets said tolerance range automatically based on said plurality of detected time deviations.

2. An electronic musical apparatus as claimed in claim 1, wherein said tolerance range setting device is to sets an advance margin before each said reference time point and a delay margin after each said reference time point separately, said advance margin and said delay margin collectively constituting said tolerance range.

3. An electronic musical apparatus as claimed in claim 2, further comprising a display device for displaying a visual image which represents the detected time deviation by illustrating the time of the player's operation in reference to the reference time point.

4. An electronic musical apparatus as claimed in claim 1, further comprising a display device for displaying a visual image which represents the detected time deviation by illustrating the time of the player's operation in reference to the reference time point.

5. An electronic musical apparatus as claimed in claim 1, wherein said tone generation control device controls generation of tones for said players operations differently in that when said time deviation falls within said set tolerance range, a tone is generated in response to said player's operation subject to evaluation, but when said time deviation falls outside said set tolerance range, no tone is generated in response to said player's operation subject to evaluation.

6. An electronic musical apparatus as claimed in claim 1, wherein the play timing notifying device notifies the reference time points in the music progression for operating said apparatus to play music via sound.

7. An electronic musical apparatus as claimed in claim 1, wherein the player's operation is a strike.

8. An electronic musical apparatus for timing training comprising:

an input device that receives user operation;

a play timing notifying device that notifies reference time points in a music progression to the user to input user operation;

an operation detecting device for detecting user operations with reference to said reference time points;

a time deviation detecting device for detecting a time deviation of each user operation corresponding to one of said reference time points;

a tolerance range setting device for setting a tolerance range with respect to each of said reference time points based on a plurality of said detected time deviations, wherein said tolerance range is for evaluating whether a detected time deviation falls within said tolerance range; and a tone generation control device that controls generation of tones for each user operation according to whether the corresponding detected time deviation falls within said tolerance range, wherein said tolerance range setting device sets said tolerance range automatically based on said plurality of detected time deviations.

9. An electronic musical apparatus as claimed in claim 8, wherein the user operation is a strike.

10. An electronic musical apparatus as claimed in claim 8, wherein the play timing notifying device notifies the reference time points in the music progression to the user via sound.

* * * * *